United States Patent
Nayak et al.

(10) Patent No.: US 6,416,251 B1
(45) Date of Patent: Jul. 9, 2002

(54) PROCESS FOR THE STABILIZATION OF SOLUBLE CHROMIUM CONTAMINATED SOLID BY DOWN DRAFT SINTERING

(75) Inventors: Bansidhar Nayak; Birendra Kumar Mohapatra; Binod Behari Nayak; Hemshankar Ray, all of Orissa (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/537,247

(22) Filed: Mar. 28, 2000

(51) Int. Cl.$^7$ ................................................. B09B 3/00
(52) U.S. Cl. .............................. 405/128.8; 405/128.75; 405/128.85; 405/128.9; 588/256
(58) Field of Search ........................ 405/128.7, 128.75, 405/128.8, 128.85, 128.9, 129.3; 588/252, 256, 257

(56) References Cited

U.S. PATENT DOCUMENTS

| | | | | |
|---|---|---|---|---|
| 2,292,495 A | * | 8/1942 | Udy | 75/238 |
| 2,332,415 A | * | 10/1943 | Udy | 75/328 |
| 4,197,115 A | * | 4/1980 | Suzuki et al. | 75/770 |
| 4,781,944 A | * | 11/1988 | Jones | 427/228 |
| 4,822,379 A | * | 4/1989 | Thompson | 44/589 |
| 5,028,034 A | * | 7/1991 | Bishop et al. | 266/150 |
| 5,245,120 A | * | 9/1993 | Srinivasachar et al. | 588/256 |
| 5,364,447 A | * | 11/1994 | Philipp et al. | 75/500 |
| 5,387,738 A | * | 2/1995 | Beckham et al. | 588/256 |
| 5,395,601 A | * | 3/1995 | Situ et al. | 423/54 |
| 5,520,719 A | * | 5/1996 | Okuno et al. | 75/758 |
| 5,556,447 A | * | 9/1996 | Srinivasachar et al. | 75/670 |
| 5,672,146 A | * | 9/1997 | Aota | 588/256 |
| 5,795,285 A | * | 8/1998 | McLaughlin et al. | 588/256 |
| 5,972,301 A | * | 10/1999 | Linak et al. | 423/53 |

FOREIGN PATENT DOCUMENTS

| | | | | |
|---|---|---|---|---|
| JP | 58174542 A | * | 10/1983 | C22C/33/04 |
| JP | 61117234 | * | 6/1986 | C22B/1/16 |
| JP | 62112734 A | * | 5/1987 | C22B/1/16 |

* cited by examiner

Primary Examiner—Heather Shackelford
Assistant Examiner—Katherine W Mitchell
(74) Attorney, Agent, or Firm—Ladas & Parry

(57) ABSTRACT

The invention relates to a process for the stabilisation of soluble chromium in contaminated solids by down draft sintering by mixing chromium contaminated solids with different proportions of CaO, MgO, $Al_2O_3$, $SiO_2$, $SO_4$ and solid carbon bearing waste materials to maintain the desired ratio of $CaO/SiO_2$, $SiO_2/Al_2O_3+Fe_2O_3$ and $SO_3/Cr$ in the mixture. The Cr(VI) and chromates are converted into non-leachable compounds.

14 Claims, No Drawings

PROCESS FOR THE STABILIZATION OF SOLUBLE CHROMIUM CONTAMINATED SOLID BY DOWN DRAFT SINTERING

FIELD OF THE INVENTION

The present invention relates to a process for the stabilisation of soluble chromium contaminated solids by down draft sintering. The invention also relates to the use of the stabilised solids in and as construction material.

BACKGROUND OF THE INVENTION

Chromium occurring in soluble state is a hazardous pollutant. Soluble chromium containing solids, water residue, sludge, powdery material etc. generated from various industrial processes and mining activities can be treated in the present process for stabilisation of the soluble chromium into insoluble forms. The stabilised solid material can be disposed and utilised as a value added product for constructional use in making building material, road and hydraulic cements.

Hexavalent state of chromium and other chromium compounds are easily soluble in water. It is well known that Cr(VI) is very hazardous and causes cancer and many other diseases. Prevention of water, soil and agricultural land from contamination of Cr(VI) and other soluble chromium chemicals is a serious concern. Many industries and mining sectors dealing with chrome and chrome chemical products generate huge quantity solids, residue and effluents contaminated with metal and chemical compounds of Cr(VI) as byproducts. Disposal and gradual accumulation of these waste materials become the source of Cr(VI) which is released slowly with time, temperature, rain water and weathering effect and contaminate to a great extent the soil agricultural land, vegetation, surface and ground water bodies. Many processes have been developed for the treatment of Cr(VI) and other heavy metal contamination of water and effluents for reuse in agriculture, industry and drinking purposes. At present very limited work had been carried out for the treatment of specific types of waste materials and solids contaminated with Cr(VI) by different techniques for its stabilisation. But there is no such common and flexible process for the treatment of all types of solid or residues containing Cr(VI) and other soluble chromium for their stabilisaton for safe disposal or further utilisation as value added material.

Meegada et al disclose the remediation and reuse of chromium containing solids through cold top ex-vitrification (Meegada, Jey; Librizzi, B.; McKenna, G. F.; Kamolpornwijit, W; Cohen, D; Vaccari, David A; Ezeldin, S; Walden, L; Noval, Barry. A.; et al [New Jersey Institute of Technology, New York, Nj07102, USA] in Hazard. Ind. Waste, 1995, 27, 470–479, (Eng.)).

Yamaoka, Hivoshi; Tsuji, Toru (Chemical Man K. K.), Kokai Tokkyo Koho JP 01, 258, 785 [89258785](Cl B09B3100)), Oct. 16, 1989 discloses the pyrrolysis of waste containing chromium (VI).

Chajduga, Adam;. Kowalski, Zygmunt; Wardas, Adam. M. (Instytut chemii Nieogaricznej) Pol. PL 135, 181 dated Dec. 11, 1981 discloses the reduction of hexavalent chromium contained in wastes obtained during the production of chromium compounds.

The above-mentioned processes involve different types of high temperature methods such as vitrification, sintering and combustion for the treatment of specific type of chrome(VI) contaminated solids for its stabilisation. The drawbacks of the above processes are the adoption of complicated high temperature systems which are energy intensive and therefore expensive. The prior art processes also require graphite, nitrogen gas, sulphur powder in the process making these processes expensive and hazardous for the environment.

Accordingly, it is necessary to develop a process that is not only inexpensive but also environmentally friendly.

OBJECTS OF THE INVENTION

The main object of the present invention is to provide a process for the stabilisation of soluble chromium contaminated solids by down draft sintering technique which obviates the drawbacks mentioned above.

It is another object of the invention to provide a process for the stabilisation of soluble chromium contaminated solids that results in a value added material useful as construction material.

It is a further object of the invention to provide a process for the stabilisation of soluble chromium contaminated solids that is economical and environmentally friendly.

It is yet another object of the invention to provide a process for the stabilisation of soluble chromium contaminated solids that is useful for all types of Cr(VI) contaminated solids.

It is yet another object of the invention to provide flexibility for the redesigning the mix according to the desired chemistry and the utilisation of various powdery materials.

It is a further object of the invention to provide for the utilisation of other plant solid wastes as additives and carbon as fuel.

It is a further object of the invention to provide a thermally efficient process with low retention of time and faster rate of sintering and cooling.

SUMMARY OF THE INVENTION

Accordingly, the presents invention provides a process for the stabilisation of solid chromium of contaminated solids by-down draft sintering technique, which comprises mixing of $SiO_2$, $Al_2O_3$, $Fe_2O_3$, $CaO$, $MgO$, $SO_4$ and solid carbon bearing materials as additives with said chromium contaminated solids in various proportions to maintain the desired ratio of $CaO/SiO_2$, $SiO_2/Al_2O_3+Fe_2O_3$ and $SO_3/Cr$ in preparations or raw mixture, homogenisation of the raw mixture by grinding or blending pelletisation of the resultant homogenised in the presence of water, sintering of the pelletised material containing in situ solid carbon by down draft technique for conversion and stabilisation of Cr(VI) and chrome chemical compounds at high temperature, crushing and grinding of the sintered material which is in the form of an aggregate for use in building and road construction and cement making.

In one embodiment of the invention, 5 to 10% solid carbon is required in the raw mix to generate the in situ heat ranging from 800 to 1500° C. for the sintering and complete conversion of soluble chromium compounds into insoluble minerals.

In another embodiment of the invention, the rate of conversion of $CaO/SiO_2$, $SiO_2/Al_2O_3+Fe_2O_3$ and $SO_3/Cr$ are in the order of <2.5; 0.5 to 4.0 and 0.2 to 1.0 respectively of the chemical factor of the homogenised raw mix for conversion and complete stabilisation of Cr(VI) and chrome compounds into insoluble minerals at high temperature.

In yet another embodiment of the invention, the particle fineness of the homogenised raw mix is of less than 150 mesh (100 micron) size.

In a further embodiment of the invention, the size of the pellets prepared from the homogenised raw in mix in the presence of water by granulation is less than 15 mm having 8 to 15% water.

In a further embodiment of the invention, the bed height of pelletised charge material in the sintering hearth is 300 to 600 mm, air draft suction pressure is below the grate bar of 200 to 500 mm water guage and vertical sintering speed from top to bottom of the bed is 15 to 20 mm per minute.

In a further embodiment of the invention, the total sintering and cooling period of the entire charge material is between 15 to 30 minutes depending on the charge material particle size, bed height and permeability, air suction pressure, sintering rate and temperature of treatment.

In a further embodiment of the invention, both sintering and cooling operations are within the sintering hearth itself.

In a further embodiment of the invention, depending on the strength and pozzolanic properties, 50 to 90% of the chromium stabilised sintered material is usable as stone aggregate in making building and 20 to 60% as pozzolana for making various types of blended cements as per Indian Standards.

In a further embodiment of the invention, solid waste carbon like cokebreeze, char, coal dust, carbonaceous sludge are used as the fuel source and other solid wastes available from thermal, iron and steel, fertilizer, paper, chemical plants are used as mineralising additives in the process.

DETAILED DESCRIPTION OF THE INVENTION

Solids, residues and sludge form any source contaminated with hexavalent chromium, chromate, chromium oxides, metals, etc. and additives materials having $SiO_2$, $Al_2O_3$, $Fe_2O_3$, CaO, MgO, $SO_4$ and carbon etc. are essential ingredients for the raw mix. The additive materials are taken from natural or waste sources such as siliceous clay, low grade bauxite, limestone and dolomatic limestone, fly ash, metallurgical dust, slag, sludge from paper and fertilizer plants, and solid carbon from coke breeze, coal, char, waste carbonaceous residues of various plants.

The additive materials are mixed with chrome contaminated solids in different proportions to maintain the desired ratio of $CaO/SiO_2<2.5$, $SiO_2/Al_2O_3<0.5$ to 4.0 and $SO_3/Cr<0.2$ to 1.0 and solid carbon of 5 to 10% to prepare the mixture. Proportion of chrome contaminated solids and additives including solid carbon may range from 30 to 80% and 20 to 70% respectively in the raw mixture. Dry and powdery materials are more suitable for use as additives. Based on the particle fineness of various materials, the mixture is ground or blended suitably to maintain 80 to 90% of the fractions below 100 micron size. The powdery mixture is then subjected to granulation in a disc/drum granulator to prepare granulated particles or pellets of below 15 mm size containing 8 to 15% of moisture. Depending on the plasticity, particle fineness, and moisture content of the mixture, 4 to 8 minutes of granulation period is found ideal to prepare the green pellets suitable for handling and charging for the purposes of sintering. The sintering of the granulated/pelletised material is carried out by commercially known down draft sintering process used in iron and steel industries for agglomeration of iron ore fines. The sintering system is quite flexible for operation in the small scale (batch operation) as well as in the large scale (continuous operation).

The sintering of the material in the down draft system takes place on the static bed by the movement of heat from the top to the bottom of the bed due to the creation of a down draft air suction below the charge bed. Solid carbon present in the charge material burns and generates in situ heat for sintering of the material. Sintering and cooling operations take place in the bed itself. The sintering system is provided with scrubbers for the cleaning of dust and hot gas. Charge material bed height, permeability of the bed, air suction pressure, sintering temperature and sintering speed are essential components of the down draft system for complete sintering of the material. Depending on the chemical characteristics of chrome contaminated solids and additive materials, the pelletised material prepared are sintered between 800 to 1500° C. by maintaining charge material bed height of 300 to 600 mm, air draft pressure of 200 to 500 mm WG and sintering rate of 15 to 22 mm per minute. The sintering at the highest temperature and subsequent cooling takes between 15 to 30 minutes and occurs within the sintering hearth itself. Due to rapid burning at high temperature of external carbon and dissociation of water present in the pelletised material, both oxidising and reducing conditions prevail in the charge bed during the sintering operation.

Cr(VI) and chromate compounds present in the pelletised particles dissociate and reduce to Cr(III). Multi phase reactions of Cr(III) then takes place with $SiO_2$, $Al_2O_3$, $Fe_2O_3$, CaO, MgO, $SO_3$ to form Cr-stabilised mineral compounds such as chromepicotite, chrome spinels, gehlenite, monticelite, ferrites, silicates of calcium, calcium aluminates and sulphoaluminates, etc. Basicity ($CaO/SiO_2$) and other ratios of $SiO_2/Al_2O_3+Fe_2O_3$, $SO_3/Cr$ and solid carbon of the raw mix govern the above reactions for complete conversion of Cr(VI) chromates, metals etc. into insoluble mineral phases. Presence of calcium silicates, ferrites, aluminates in the sintered material gives a pozzolanic effect enabling further use as construction material.

A Laboratory set up batch scale unit of down draft sintering system consisting of 400×400 mm cross section area and 650 mm height of the sintering hearth of capacity 40 to 80 kg charge material per batch has been used to conduct experiments in different bed height, air suction pressure, sintering speed, sintering and cooling time to establish the parameters, sintering conditions, and reproducibility of the process of treatment of various types of chrome contaminated solids, residue and sludge.

The following examples are given by way of illustration only of the present invention and are not to be construed as limiting the scope of the present invention in any manner.

EXAMPLE 1

A lateritic overburden soil of size below 20 mm of a chromite mine which contains 0.38 mg/gm of hexavalent chromium is used for the treatment. The lateritic soil contains 25% $Fe_2O_3$, 47% of $SiO_2$, 6% of $Al_2O_3$, 5.8% of MgO, 3.5% $Cr_2O_3$, and 11.5% water loss on ignition as major constituents. A raw mixture is prepared by taking on weight basis 75% of lateritic overburden material, 20% of blast furnace flue dust which contains carbon, $SiO_2$, $Al_2O_3$, $Fe_2O_3$, CaO, MgO, etc. and 5% of sulphatic waste of a fertilizer plant. The mixture is ground together in a ball mill for homogenisation and to maintain less than 100 micron size particle fineness. The ground mixture contains 5% solid carbon and ratio of $CaO/SiO_2$, $SiO_2/Al_2O_3+Fe_2O_3$ and $SO_3/Cr$ are in the order of 0.3, 0.8 and 0.2 respectively. It is granulated for 5 minutes in a disc granulator in the presence of 12% water to prepare pellets of below 12 mm sizes. 50 kg of pelletised material is fed to the 400 mm×400 mm cross section area and 650 mm height sintering hearth of the down draft sintering system. Sintering is conducted in 450 mm charge bed height (50 kg. pellet), applying 350 mm WG air suction pressure below the charge bed, at 1240° C. bed temperature, 18 mm per minute of vertical sintering speed to complete both sintering and cooling in 27 minutes. The discharged sintered materials are in the form of lumpy aggregate having physical properties such as 1050 kg/M$^3$ bulk density, 14% water absorption, 85 kg crushing strength and 0.0002% of water soluble chromium. Stabilisation of water soluble chromium is more than 99% in the aggregate compared to the original feed material. These aggregates are safe for disposal and suitable in making light weight building bricks, block and concrete with cement and lime.

EXAMPLE 2

A waste solid residue of a dichromate manufacturing plant containing 3.8% of sodium chromate, 7% of partially soda and lime reacted chrome particles and 1.15% of Cr(VI) is used for the sintering treatment. The residue contains other constituents such as $SiO_2$, $Al_2O_3$, $Fe_2O_3$, CaO, $Na_2O$, MgO in the order of 16%, 12%, 13%, 31%, 2.8%, 8.7% on weight basis respectively. A charge mixture is prepared keeping in mind the chemistry of the waste dichromate residue. The charge material consists of 20% fly ash, 8% by product gypsum and 12% coke breeze on weight basis. The mixture is ground in the ball mill to bring down the particle size to below 100 microns. $CaO/SiO_2$, $SiO_2/Al_2O_3+Fe_2O_3$ and $SO_3/Cr$ are in the order of 1.88, 3.20 and 0.87 respectively and solid carbon 9%. The powdery mixture is pelletised to prepare less than 10 mm size pellets with 11% water by the disc granulator. 75 kg of the granulated pellet is charged to a 400×400×600 mm height sintering hearth maintained at 600 mm charge material height. The sintering is carried out by applying 450 mm WG air suction, 22 mm per minute of vertical sintering speed, 1450° C. of bed temperature to complete both the sintering and cooling operations in 30 minutes. The disc charged sintered materials are in the form of irregular lumpy aggregates having 1120 kg/M$^3$ bulk density, 12% water absorption, 80 kg of average crushing strength. The water soluble chromium of the sintered mass is 0.0006%. The stabilisation of water soluble chromium is more than 99% compared to the original residue of the dichromate plant. The sintered aggregate also contains different hydraulic mineral phases like calcium silicate, calcium aluminate etc. which is suitable for use as pozzolanic aggregate. Blended cements prepared with 20% and 30% of this aggregate are found to be satisfactory as per Indian Standards of 33 grade cements.

From the above examples, it is evident that the solid and residue of any range of chemical composition and water soluble chromium can be processed by keeping the desired ratio of $CaO/SiO_2$, $SiO_2/Al_2O_3+Fe_2O_3$ and $SO_3/Cr$ and percentage of solid carbon with or without additives for stabilisation of soluble chromium at high temperature. The process has the flexibility to incorporate various additives so as to make the use of chromium stabilised sinters as value added materials.

Advantages of the Invention

The main advantages of the present invention are:
1. Bulk utilisation of different types of solids, residues and sludge of any particle size and content of hexavalent chromium and hazardous chrome chemical compounds in the process.
2. Scope of utilisation of other plant solid wastes as additives and solid carbon as fuel.
3. Utilisation of various powdery materials and flexibility in designing the raw mix according to the desired chemistry.
4. Flexibility to achieve 800 to 1500° C. temperature and oxidising and reducing conditions in the sintering process to enable dissociation and complete stabilisation of soluble chromium.
5. Scope for the re-utilisation of chrome stabilised sintered products as aggregates in construction of building and road by replacing natural aggregates and as pozzolanic material in making blended cements.
6. Suitability for treatment of various chrome [Cr(VI)] contaminated solids in large scale at high temperature since the process is thermally efficient, economical and pollution free.
7. High productivity in the down draft sintering process due to the low retention time and faster rate of sintering and cooling.

We claim:

1. A process for the stabilisation of soluble chromium in contaminated solids by down draft sintering, which comprises mixing chromium contaminated solids with different proportions of CaO, MgO, $Al_2O_3$, $SiO_2$, $SO_4$ and solid carbon bearing waste materials to maintain a ratio of $CaO/SiO_2$ of <2.5, $SiO_2/Al_2O_3+Fe_2O_3$ of 0.5 to <4 and $SO_3/Cr$ of 0.2 to 1 in the mixture, homogenisation of the mixture, pelletisation of the mixture in the presence of moisture to form a pelletised charge material, sintering of the pelletised charge material at a temperature in the range of 800 to 1500° C. by down draft sintering to convert and stabilise the Cr(VI) and chromates into stable non-leachable compounds to obtain soluble chromium stabilized sintered material.

2. A process as claimed in claim 1 wherein the homogenisation is done by blending or granulating.

3. A process as claimed in claim 1 wherein the contaminant is hexavalent chromium.

4. A process as claimed in claim 1 wherein the amount of solid carbon is in the range of 5 to 10%.

5. A process as claimed in claim 1 wherein the solid carbon acts as a fuel for the in situ generation of heat in the range of 800 to 1500° C. during sintering.

6. A process as claimed in claim 1 wherein the ratio of $CaO/SiO_2$, $SiO_2/Al_2O_3+Fe_2O_3$ and $SO_3/Cr$ is maintained in the order of <2.5, 0.5 to 4.0, and 0.20 to 1.0, respectively, for the stabilisation of Cr(VI) and chromates at a temperature in the range of 800° to 1500° C.

7. A process as claimed in claim 1 wherein the height of the pelletised charge material in a bed is in the range of 300 to 600 mm.

8. A process as claimed in claim 1 wherein the down draft sintering is carried out at a vertical sintering speed in the range of 15 to 22 mm per minute.

9. A process as claimed in claim 1 wherein the down draft sintering comprises a heating and cooling period in the range of 20 to 30 minutes.

10. A process as claimed in claim 9 wherein the sintering and cooling occurs in the sintering hearth itself.

11. A process as claimed in claim 1 wherein the soluble chromium stabilized sintered material contains 50 to 90% of stone aggregates usable in making building materials.

12. A process as claimed in claim 1 wherein the soluble chromium stabilised sintered material contains 20 to 60% material usable as pozzolona in making blended cements.

13. A process as claimed in claim 1 wherein the pelletised charge material comprises green pellets each of size less than 15 mm in diameter with a moisture content between 8 to 15% wherein the green pellets are prepared from mixture particles having a fineness below 100 microns.

14. A process as claimed in claim 1 wherein the sintering of the pelletised charge material is conducted at an air draft suction pressure in the range of 200 to 500 mm WG.

* * * * *